(12) United States Patent
Barber

(10) Patent No.: US 6,398,199 B1
(45) Date of Patent: Jun. 4, 2002

(54) COIL SPRING ASSEMBLY

(75) Inventor: James R. Barber, Anderson, IN (US)

(73) Assignee: Barber Manufacturing Company, Inc., Anderson, IN (US)

( * ) Notice: Subject to any disclaimer, the term of this patent is extended or adjusted under 35 U.S.C. 154(b) by 0 days.

(21) Appl. No.: 09/390,042

(22) Filed: Sep. 3, 1999

(51) Int. Cl.$^7$ ................................................. F16F 3/00
(52) U.S. Cl. .......................................... 267/93; 5/655.8
(58) Field of Search .............................. 267/93; 5/727, 5/655.8

(56) References Cited

U.S. PATENT DOCUMENTS

| | | | |
|---|---|---|---|
| 685,160 A | 10/1901 | Marshall | |
| 698,529 A | 4/1902 | Marshall | |
| 1,051,466 A | * 1/1913 | Travis | |
| 1,852,943 A | * 4/1932 | Swanson | |
| 1,930,697 A | * 10/1933 | Stewart | |
| 2,236,007 A | * 3/1941 | Oldham | |
| 2,504,352 A | 4/1950 | Robell | 5/351 |
| 2,558,288 A | 6/1951 | Backus | 5/248 |
| 2,568,055 A | * 9/1951 | Clark | |
| 2,715,435 A | * 8/1955 | Rymland | |
| 3,082,438 A | 3/1963 | Nachman, Jr. | 5/353 |
| 3,230,558 A | 1/1966 | Duncan | 5/353 |
| 4,234,983 A | 11/1980 | Stumpf | 5/477 |
| 4,234,984 A | 11/1980 | Stumpf | 5/477 |
| 4,462,129 A | 7/1984 | Brannock | 5/474 |
| 4,578,834 A | 4/1986 | Stumpf | 5/477 |
| 4,677,701 A | 7/1987 | Galumbeck | 5/447 |
| 4,679,266 A | 7/1987 | Kraft | 5/464 |
| 4,726,572 A | 2/1988 | Flesher et al. | 267/91 |
| 4,771,495 A | 9/1988 | Distler et al. | 5/478 |
| 4,854,023 A | 8/1989 | Stumpf | 29/91 |
| 4,972,536 A | 11/1990 | Scott | 5/464 |
| 5,040,255 A | 8/1991 | Barber, Jr. | 5/477 |
| 5,062,172 A | 11/1991 | Stewart | 5/474 |
| 5,136,740 A | 8/1992 | Kraft | 5/464 |
| 5,210,890 A | * 5/1993 | Hagglund | 5/239 |
| 5,222,264 A | * 6/1993 | Morry | 5/475 |
| 5,756,022 A | * 5/1998 | Siegel | 264/46.7 |
| 5,803,440 A | 9/1998 | Wells | 267/92 |
| 5,868,383 A | 2/1999 | Codos | 267/80 |

FOREIGN PATENT DOCUMENTS

| | | |
|---|---|---|
| DE | 40 31 651 A1 | 10/1990 |
| DE | 297 10 267 U1 | 8/1997 |
| FR | 2 697 420 | 10/1992 |
| WO | WO 91/10387 | 7/1991 |

* cited by examiner

*Primary Examiner*—J. J. Swann
*Assistant Examiner*—Christopher Bottorff
(74) *Attorney, Agent, or Firm*—Woodard, Emhardt, Naughton, Moriarty & McNett (57) ABSTRACT

A coil spring assembly is provided that includes rows of pocketed coil springs, a top securing sheet and a bottom securing sheet. The assembly may be partitioned into sections of varying firmness. The rows of coil springs are positioned between the top and bottom securing sheets. Coil spring assemblies are provided that further include top and bottom securing members that further stabilize the pocketed coil springs.

10 Claims, 15 Drawing Sheets

COIL SPRING ASSEMBLY

BACKGROUND OF THE INVENTION

The present invention relates generally to coil spring assemblies. The coil springs assemblies may be advantageously incorporated into an innerspring mattress.

A variety of mattresses with coil spring assemblies are known. Many of these mattresses are designed to have uniform firmness across the entire mattress. Each spring in the mattress is designed to exert the same resistance force for a given deformation, even though the weight which the spring is supporting typically varies substantially. For example, individuals having different body weights may share a bed. Moreover, the weight of different regions of an individual's body can vary, such as the head region, torso region and the leg region. These different regions of the body may exert different forces in different regions of the mattress. For example, the head and leg region of the body may exert less force in regions of the mattress compared to the torso region and would thus result in the mattress sagging in the region of the torso.

Methods of making coil spring assemblies having regions of varying firmness have included increasing the number and density of coil springs, as well as using firmer springs, in selected regions of the assembly. Notwithstanding the variety of coil spring assemblies having regions of varying firmness known in the art, there is a continuing need for improved coil spring assemblies, especially coil spring assemblies having regions of varying firmness. The present invention addresses this need.

SUMMARY OF THE INVENTION

The present invention relates to coil spring assemblies. The coil spring assemblies may advantageously be incorporated into a mattress. In one aspect of the invention, a coil spring assembly is provided that includes rows of coil springs, a top securing sheet and a bottom securing sheet wherein the assembly is partitioned into at least two sections of varying firmness. The firmer section is formed from coil springs having a height in their relaxed state larger than the height of coil springs in the other section in their relaxed state. Each of the coil springs has a top surface, a bottom surface and a longitudinal axis. Each of the coil springs are further encased in a pocket. The pocket includes a top surface, a bottom surface and a side wall connecting the top surface and bottom surface and may be formed from fabric. Each of the fabric pockets may be, in one embodiment, interconnected with an adjacent fabric pocket within the same row. A plurality of the coil springs are perimetrical coil springs. The rows of coil springs are positioned between the top securing sheet and the bottom securing sheet wherein each sheet has an inner face and an outer face.

In yet another aspect of the invention, the coil spring assemblies described above may further include top and/or bottom border members. In an embodiment of a coil spring assembly including both top and bottom border members, the rows of coil springs are further positioned between the top and bottom border members.

It is an object of the invention to provide improved coil spring assemblies.

It is a further object of the invention to provide coil spring assemblies having varying sections of firmness.

These and other objects and advantages of the present invention will be apparent from the description herein.

BRIEF DESCRIPTION OF THE FIGURES

FIG. 16 is a collective side elevation of coil springs showing them in a relaxed state before being inserted into pockets (FIGS. 16A and B) and also showing them in a partially compressed state after being inserted into pockets (FIG. 16C being a section along line 16—16 of FIG. 8).

DESCRIPTION OF THE PREFERRED EMBODIMENTS

For the purposes of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

The present invention provides improved coil spring assemblies that may advantageously be incorporated into an innerspring mattress. In one aspect, a coil spring assembly is provided that includes rows of pocketed coil springs stabilized by top and bottom securing sheets. The assembly may be partitioned into sections of varying firmness. In another aspect of the invention, a coil spring assembly is provided that includes pocketed coil springs stabilized by top and bottom border members as well as top and bottom securing sheets. In this second aspect of the invention, the coil spring assembly may also be partitioned into sections of varying firmness.

Figure 1:
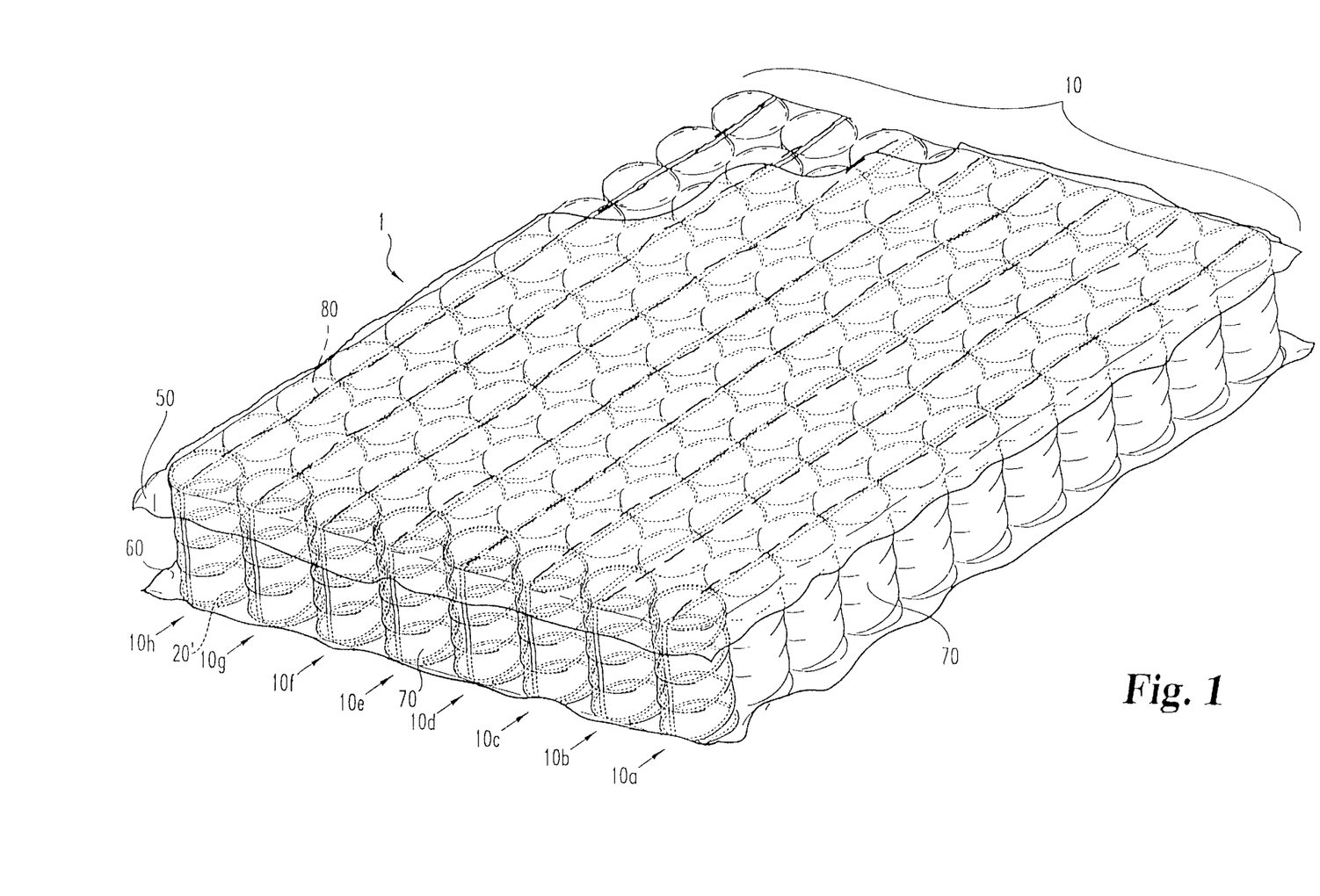
FIG. 1 depicts a side perspective view of one embodiment of a coil spring assembly.
Figure 2:
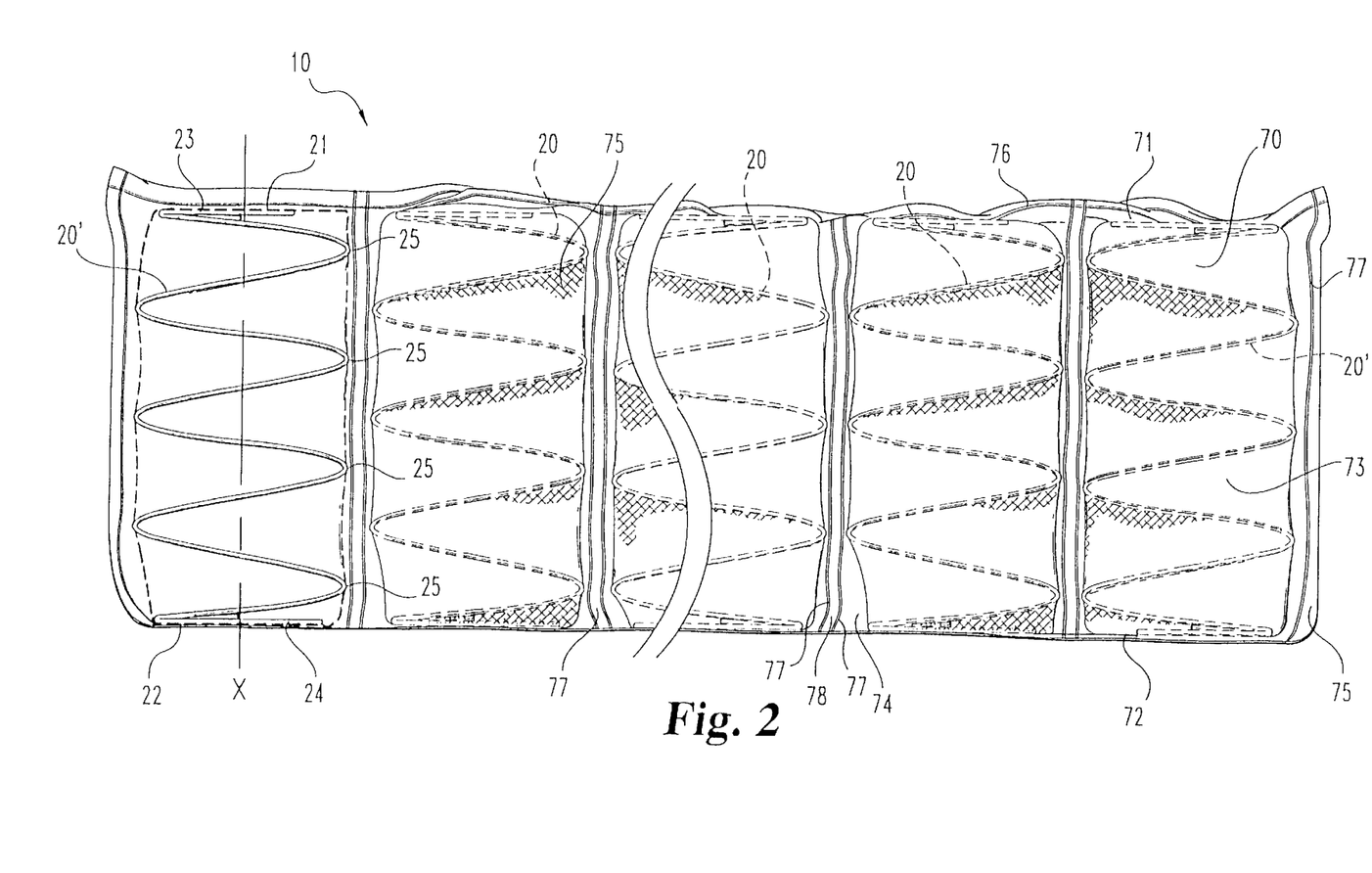
FIG. 2 depicts a side view of a row of pocketed coil springs in the coil spring assembly in FIG. 1. The pocketed coil springs are shown without securing sheets for clarity.
Figure 3:
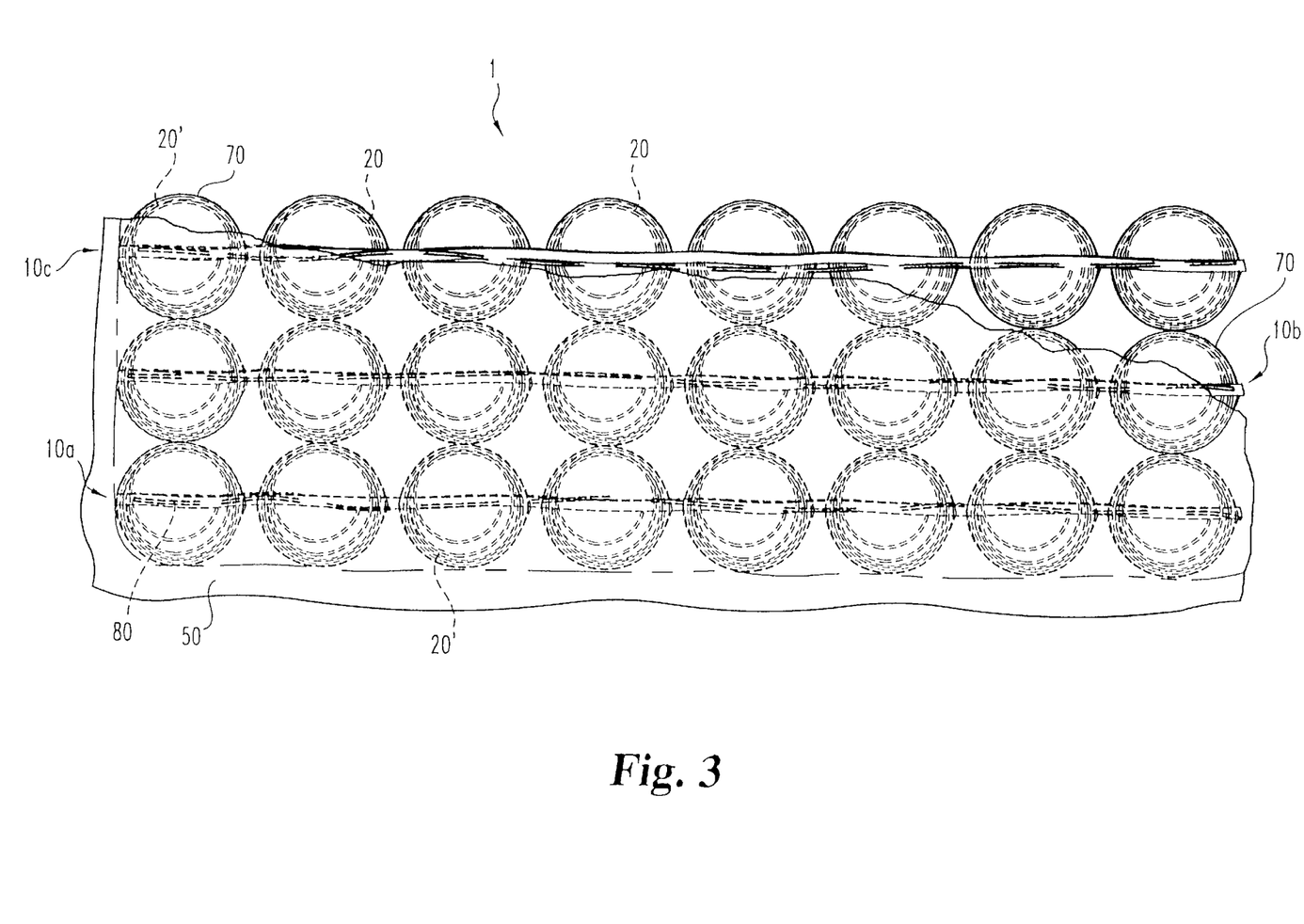
FIG. 3 depicts a top view of a portion of the coil spring assembly of FIG. 1.

As discussed above, one aspect of the invention provides an improved coil spring assembly including rows of pocketed coil springs stabilized by top and bottom securing sheets. Referring now to FIGS. 1–3, coil spring assembly 1 includes rows 10 (designated as 10a–10h) of coil springs 20,20' that are positioned between a top securing sheet 50 and a bottom securing sheet 60. Coil springs 20,20' are stabilized by being connected to top securing sheet 50 and bottom securing sheet 60. In certain embodiments, top securing sheet 50 may help in distributing loads across the surface of the assembly. Each coil spring 20 is also separately enclosed in a pocket 70, including perimetrical coil springs 20' that are specifically located along the periphery, or perimeter, of the assembly. As best seen in FIG. 2, each coil spring 20,20' has a top surface 21, a bottom surface 22 and a central longitudinal axis X. Top surface 21 is defined by top coil 23, whereas bottom surface 22 is defined by bottom coil 24. In this embodiment, five intermediate coils 25 lie between top coil 23 and bottom coil 24, making a total of 7 coils that define each coil spring 20,20'. This number may vary as known in the art.

The outer diameter of the coils may also vary as one skilled in the art would appreciate. For example, top coil 23 and bottom coil 24 may have a smaller outer diameter [e.g., about 1.75 in (4.5 cm) to about 2.25 in (5.8 cm)] than intermediate coils 25 [(e.g., outer diameter of about 2.00 in (5.1 cm) to about 2.625 in (6.7 cm)] to form barrel-shaped coil springs. Alternatively, the outer diameter of top coil 23 and bottom coil 24 may be larger [e.g., about 2.25 in (5.8 cm) to about 3.25 in (8.3 cm)] than the outer diameter of intermediate coils 25 [e.g., an outer diameter of about 1.50 in (3.8 cm) to about 2.00 in (5.1 cm)] to form hourglass-shaped coil springs. Such hourglass-shaped coil springs result in firmer coil springs compared to barrel-shaped springs, and therefore allow for more versatility in adjusting the firmness of the coil spring assembly. In yet other embodiments, the outer diameters of the coils may be uniform. Other configurations of coil springs may also be known to the skilled artisan.

Each coil spring 20,20' is made from metal wire composed of metals known in the art, including high carbon spring wire and Marshall Pack spring wire, but preferably automatic coiling and knotting high carbon spring wire. Although the diameter of the metal wire that is used may vary depending on factors known in the art including the amount of weight to be supported as well as the desired firmness of the assembly, the diameter of the metal wire used to form each coil spring 20,20' is about 15 gauge. Each metal wire is formed into a helical, or coil, pattern by methods and equipment known in the art. After each coil spring 20,20' is formed, it is subsequently heat-tempered in order to build memory into the spring to provide increased spring force as well as extended longevity of the action of the coil spring. Briefly, the heat-tempering process includes heating the coil springs to a temperature of about 500° F. (about 260° C.) to about 600° F. (about 316° C.) by applying 50 amperes of current for approximately one second from one end of the spring to the other. After the heat-treatment, each coil spring 20,20' is individually encased in a pocket 70.

FIG. 2 further depicts a row 10 of coil springs without top securing sheet 50 or bottom securing sheet 60 so that pockets 70 may be clearly seen. Each pocket 70 is defined by a top surface 71, a bottom surface 72 and a side wall 73 connecting top surface 71 and bottom surface 72. Pockets 70 are preferably formed from a fabric 75 composed of a material that allows for the fabric to be joined, or welded, together by heat and pressure, as in an ultrasonic welding or similar thermal welding procedure. For example, fabric 75 may be composed of a thermoplastic fiber known in the art, such as non-woven polymer based fabric, non-woven polypropelene material or non-woven polyester material. However, a wide variety of textile fabrics or other sheet material known in the art may be used if the material is joined together by stitching, use of metal staples, or other methods known in the art. Fabric 75 may further be woven or non-woven but is preferably non-woven.

Pockets 70 are formed by methods and equipment known in the art. Fabric 75 used to form pocket 70 is typically folded in half and is joined together at top surface 71 and side edges 74 of side wall 73 to form, or define, pocket 70. Although fabric 75 may be joined together to form pockets 70 by stitching or use of metal staples as known in the art, the fabric 75 is preferably joined together by a thermal welding procedure to form welds 76 at top surface 71 and welds 77 at side edges 74. Each of the pockets are preferably interconnected with an adjacent pocket in the same row. In alternative embodiments, each of the pockets may be separate from adjacent pockets in the same row.

As best seen in FIG. 2, welds 76 extend along the length of each row and specifically along top surface 71 of each pocket 70 in each row 10. A line of welds 76 extend along top surface 71 of each pocket 70 such that they are preferably perpendicular, transverse in other embodiments, to central longitudinal axis X of coil springs 20,20'. It can also be seen that two sets of welds 77 are present that extend along side edges 74 preferably perpendicularly, but may extend transversely in other embodiments, with respect to welds 76 and thus define a border 78 between adjacent pockets in the same row. Although two sets of welds 77 are shown, either one or more than two welds may be present. Furthermore, a continuous welding pattern is shown defined by welds 76 and 77 in FIG. 2. Although a wide variety of continuous or spaced-apart patterns may be used to secure the fabric together, spaced-apart patterns are preferred as forming such welds decreases the possibility of burning through the fabric.

Figure 4:
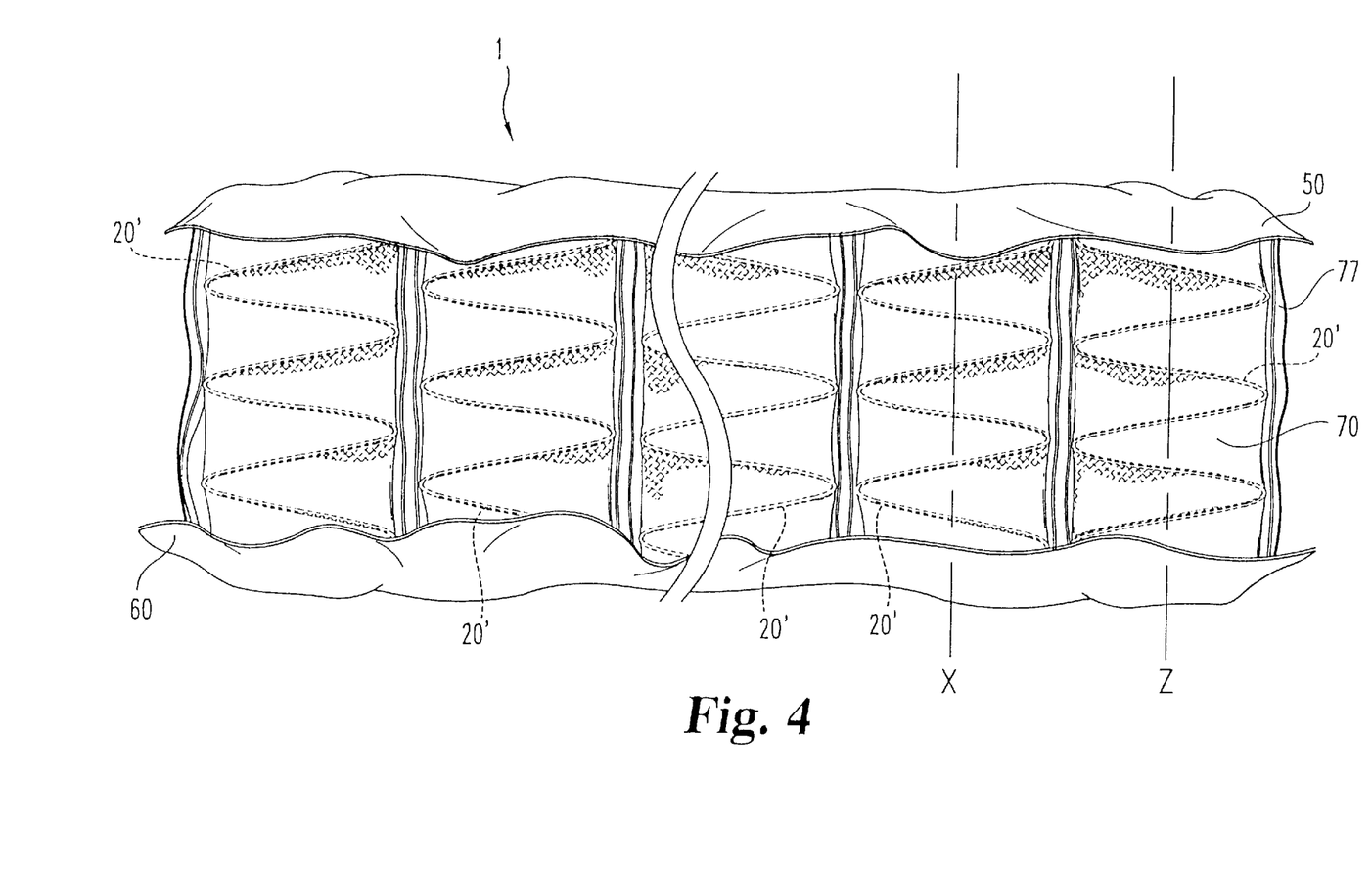
FIG. 4 depicts a side view of the coil spring assembly of FIG. 1.

As best seen in FIG. 4, each coil spring in assembly 1 is positioned such that the central longitudinal axis X of the coil springs are parallel to, and preferably aligned with, the central longitudinal axis Z of pockets 70. Furthermore the central longitudinal axes X of coil springs 20,20' are substantially parallel to, and aligned with, the central longitudinal axes X of adjacent coil springs in the same row. Moreover, each coil spring 20,20' has been compressed from its full height to a predetermined height when placed into pocket 70. Thus, each coil spring 20,20' is under compression within each pocket 70.

As mentioned above and as seen in FIGS. 1 and 4, the rows of pocketed coil springs are positioned between a top securing sheet 50 and a bottom securing sheet 60. Sheets 50 and 60 may be composed of the same flexible material that fabric 75 is composed of, but are preferably composed of a material that is softer and more stretchable than fabric 75, such as polypropolene or polyester material. Other similar textile fabrics known in the art may also be used. Top securing sheet 50 and bottom securing sheet 60 are preferably connected to top surface 71 and bottom surface 72 of the respective pockets 70, respectively. Such a connection aids in securing or stabilizing coils springs 20,20'. Sheets 50 and 60 are preferably connected to top surface 71 and bottom surface 72 of pockets 70, respectively, by an adhesive 80 known in the art, such as a hot melt adhesive. Adhesive 80 is applied in any manner that will aid in securing the coil springs. The adhesive is preferably applied along each row as a line of adhesive that extends from a coil spring at one end of a row to a coil spring at the other end of the same row as seen in FIG. 1, but may be applied in other configurations as known in the art. The line of adhesive may be unbroken (i.e., continuous) or broken.

Figure 5:
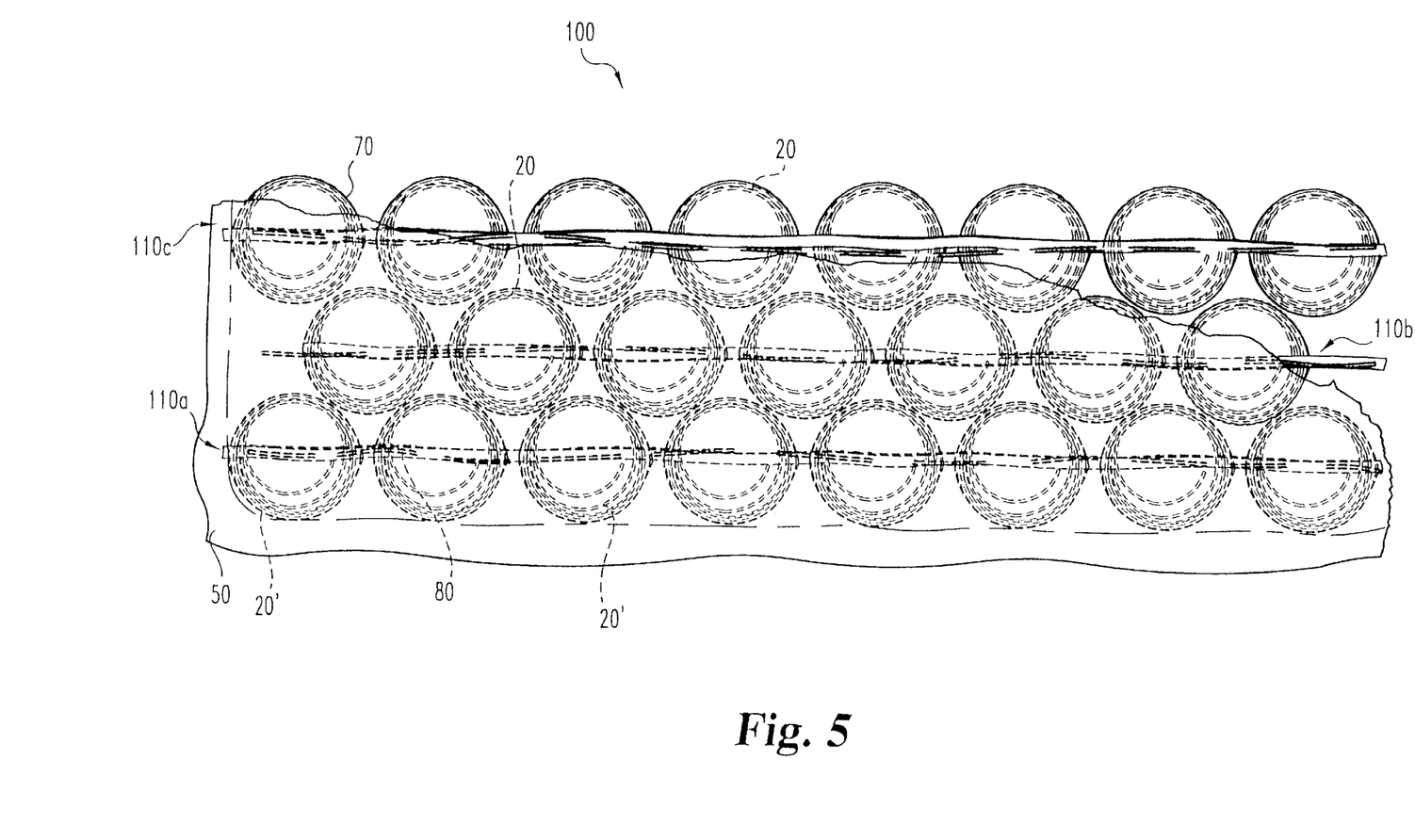
FIG. 5 depicts a top view of an alternative embodiment of a coil spring assembly, showing nesting of adjacent rows of pocketed coil springs.

In an alternative embodiment as seen in FIG. 5, each row 110 is nested within an adjacent row 110 (e.g., row 110b is nested within row 110a, row 110c is nested within row 110b, etc.) to form coil spring assembly 100. Such nested configurations provide more support than non-nested configurations. In yet other embodiments, coil spring assemblies may be formed from a combination of nested and non-nested configurations. Assembly 100 is identical in all respects to assembly 1, with the exception that the pocketed coil springs are arranged in a nested configuration. Therefore, components of the coil spring assembly that are shown in FIG. 5 and that are labeled with the same reference numerals as in FIGS. 1–4 are identical. Moreover, other, different figures that show components labeled with the same reference numerals are also identical.

Figure 6:
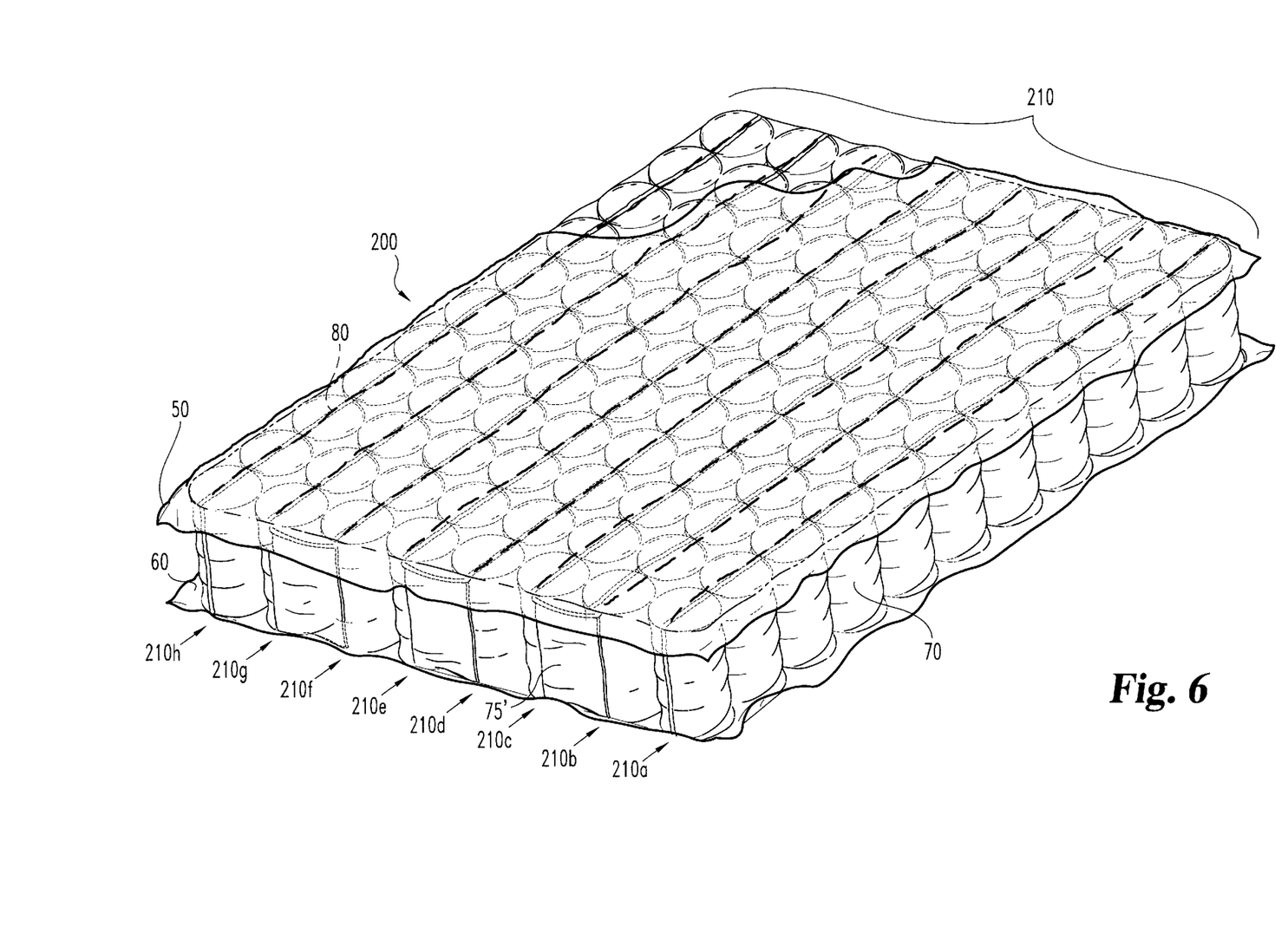
FIG. 6 depicts a perspective view of an alternative embodiment of a coil spring assembly wherein the pocketed coil springs are formed from a single long row, or string, which is placed in serpentine fashion in the assembly to form each row 210.
Figure 7:
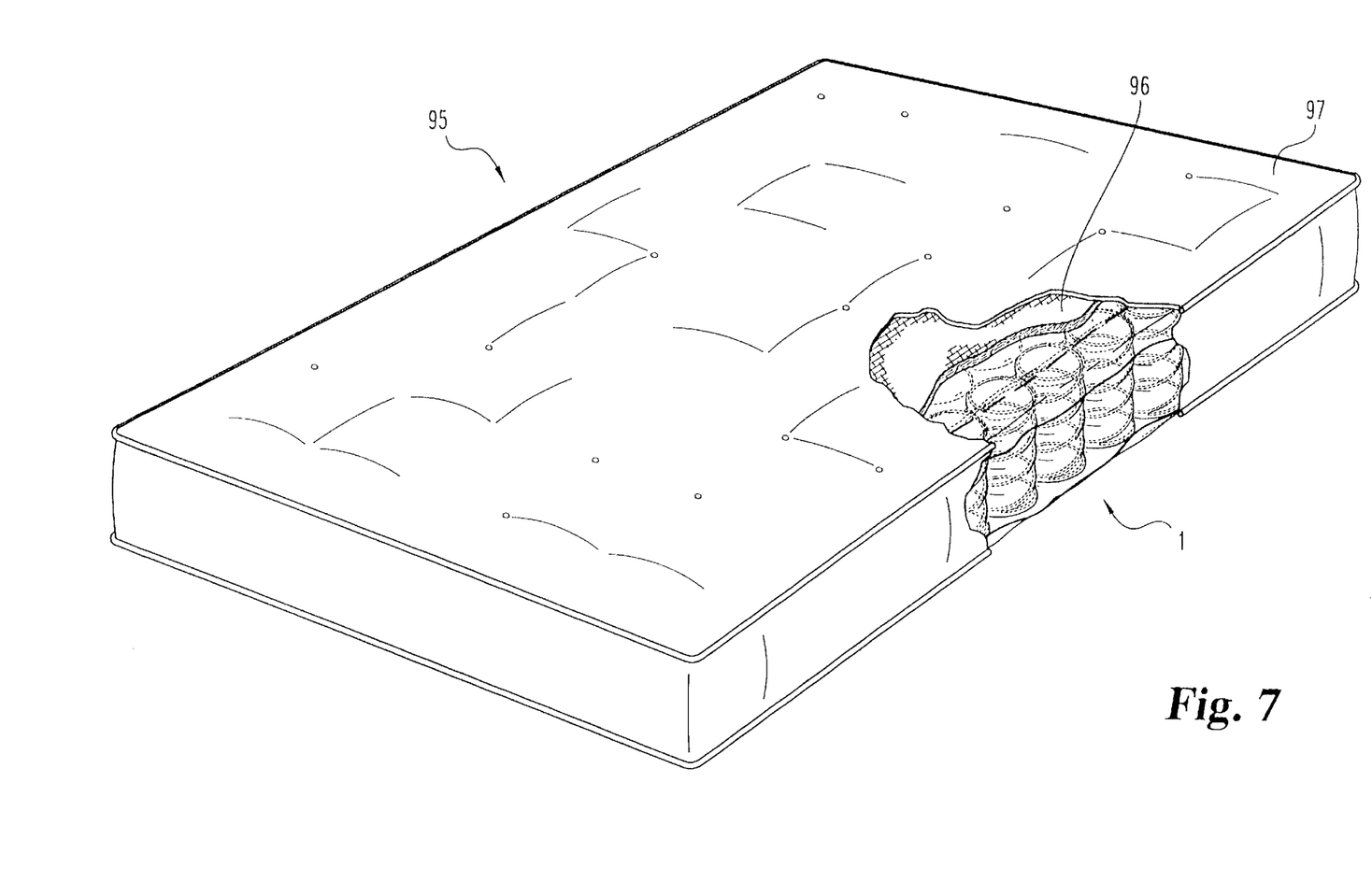
FIG. 7 depicts a side perspective view of a mattress, including a coil spring assembly of the present invention depicted in FIG. 1.

In the embodiment of coil spring assembly 1 shown in FIGS. 1, 3 and 5 each row of pocketed coil springs is separate from adjacent rows. In an alternative embodiment shown in FIG. 6, each row 210 (designated as rows 210a–210g) of coil spring assembly 200 is formed from a single long row, or string, which is placed in serpentine fashion in the assembly. Other than this distinction, and the fact that a greater length of interpocket fabric 75' (i.e., fabric between the pockets) is required in order to make the turn to form an adjacent row, coil spring assembly 200 is identical to coil spring assembly 1. As discussed above, the assembly may be a component of a mattress 95 as shown in FIG. 7 that includes coil spring assembly 1 covered by padding 96. Padding 96 may be covered by upholstery covering 97 as known in the art.

Figure 8:
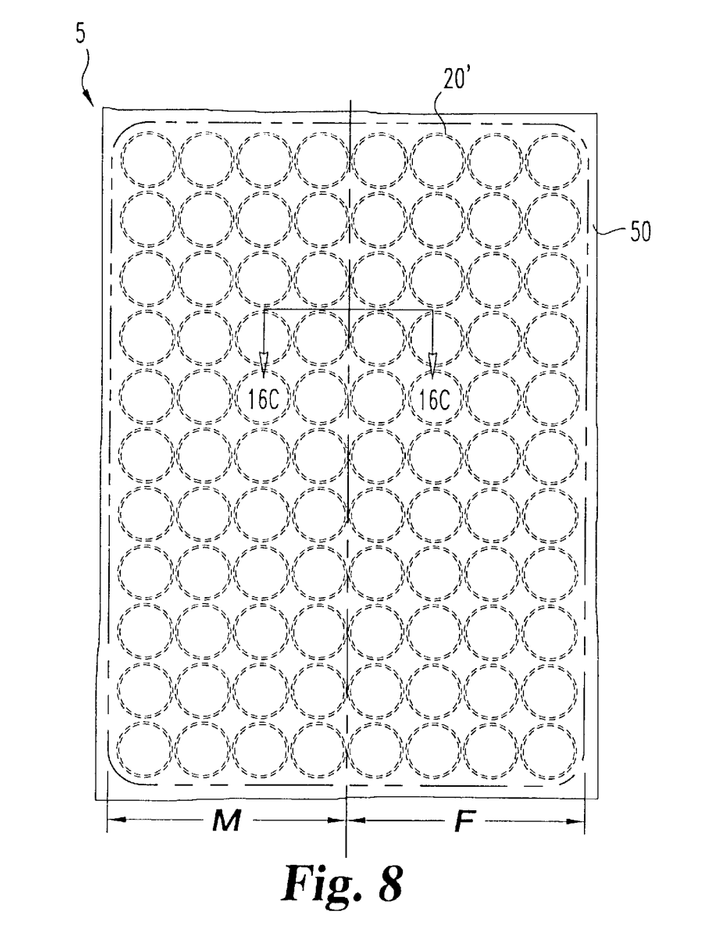
FIG. 8 diagrammatically depicts a top view of a coil spring assembly, showing sections M and F of varying firmness.

The coil spring assembly preferably has sections of varying firmness. In one embodiment of the invention, the coil spring assembly is partitioned into at least two sections. One of the sections is posturized. The term "posturized" is used herein to refer to the increase in firmness of one section relative to another. Referring now to FIG. 8, coil spring assembly 1, shown diagrammatically in the figure, may be partitioned into sections M and F to form coil spring assembly 5. Sections M and F may be formed by dividing the coil spring assembly in half along its length. Section M may be, for example, the firmer section whereas section F may be the less firm section.

Figures 16, 16A, 16B, 16C:
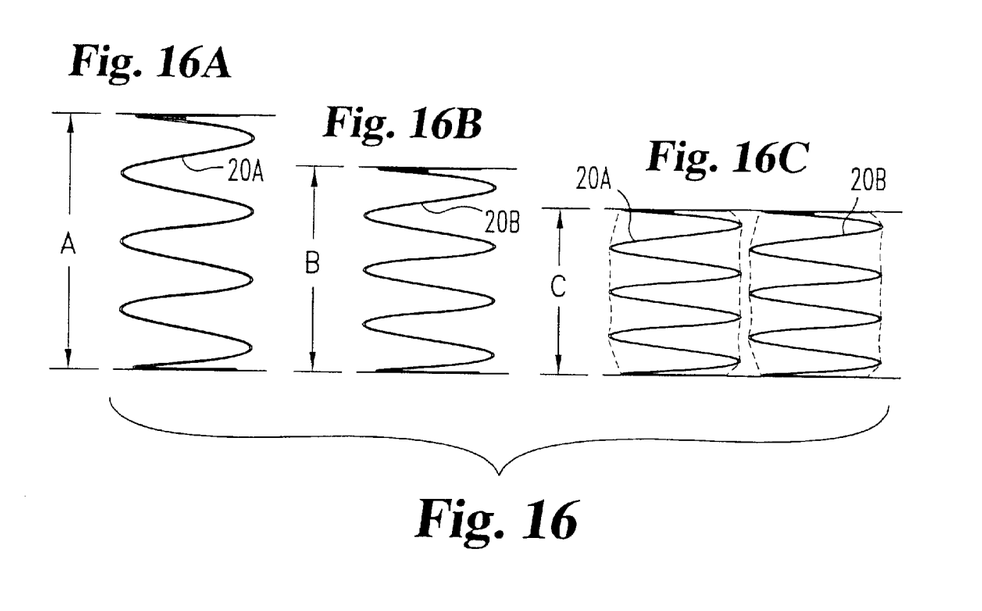

The coil springs in the firmer section typically have a height that is greater in their relaxed state (i.e., not enclosed in fabric pockets or part of the assembly) than the coil springs in the less firm section in their relaxed state. Thus, as shown in FIG. 16, the most leftward FIG. 16A shows the more firm spring 20A in relaxed state. The middle FIG. 16B shows the less firm spring 20B in relaxed state. The most rightward FIG. 16C is a section taken along the line 16 of FIG. 8. When the coil springs are placed in the pockets as shown in FIG. 16C, the coil springs 20A in the firmer section are compressed to the same height as the coil springs 20B in the less firm section. That is, all of the pocketed coil springs in the assembly may be of uniform height. This is shown in the sectional view 16C where the more leftward spring 20A has been compressed a greater amount to insert it into the pocket than the rightward spring 20B. When a given force is applied to either section of the assembly, the coil springs in the firmer section will be compressed less than the coil springs in the less firm section. Stated alternatively, a greater force must be exerted on the assembly in the firmer section to achieve a given deformation compared to the less firm section.

Figure 17:
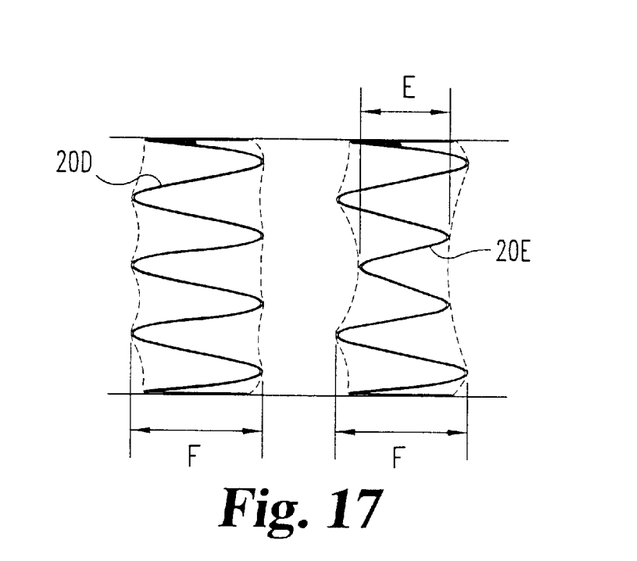
FIG. 17 is a cross section of an alternative embodiment of coil spring assembly.

Other approaches can be used to vary the firmness of the sections of the coil spring assembly. For example greater firmness may be provided by a spring of lesser diameter. Thus FIG. 17 depicts a cross section of a spring assembly like FIG. 16C in which the intermediate portions of the rightward coil spring 20E have a lesser diameter E than the diameter F of the intermediate portions of the leftward coil spring 20D. Thus the rightward coiled spring will be stiffer than the leftward coil spring.

Figure 9:
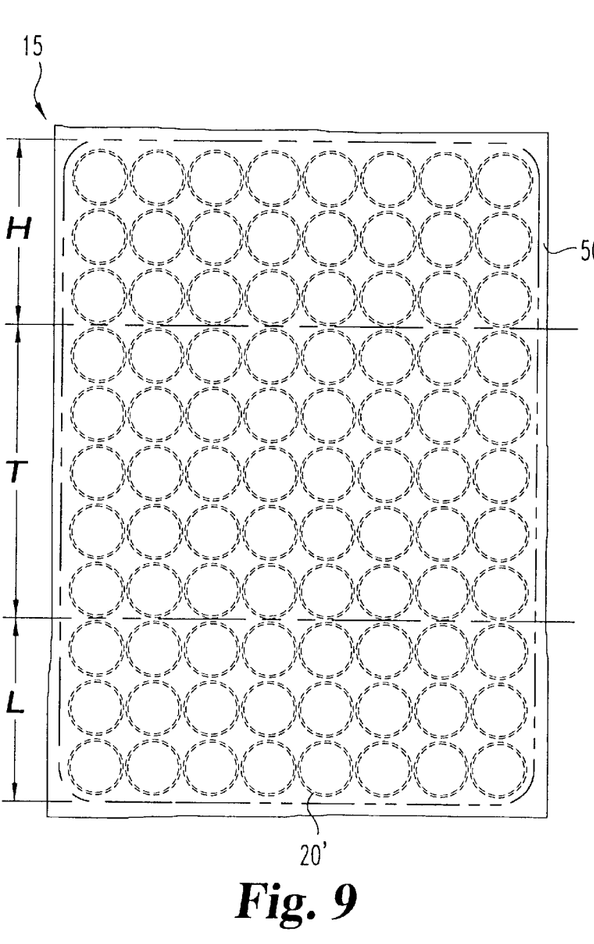
FIG. 9 diagrammatically depicts a top view of a coil spring assembly, showing sections H, T and L of varying firmness.

The specific number of sections the coil spring assembly may be partitioned into will depend on the specific need. For example, the coil spring assembly may be divided into a head section H, a torso section T and a leg section L to form coil spring assembly 15 as seen in FIG. 9. These sections may extend along the length and width of the assembly. Although one skilled in the art would know that the dimensions of these sections may vary for different individuals, for an average individual about 5.5 ft (1.7 m) in height and a coil spring assembly 60 in (1.53 m) in width, the H section typically extends a length of about 27 in (0.69 m), the T section typically extends a length of about 26.0 in (0.66 m), and the L section typically extends a length of about 27.0 in (0.69 m).

In yet another aspect of the invention, and referring to FIGS. 10–14, the coil springs may be further stabilized by attaching perimetrical coil springs 20' to a top border member 30 and/or a bottom border member 40 to form coil spring assembly 300. Coil spring assembly 300 is identical to coil spring assembly 1, with the exception that coil spring assembly 300 further has top and bottom border members as well as components that secure the members to the coil springs as described below.

Figure 10:
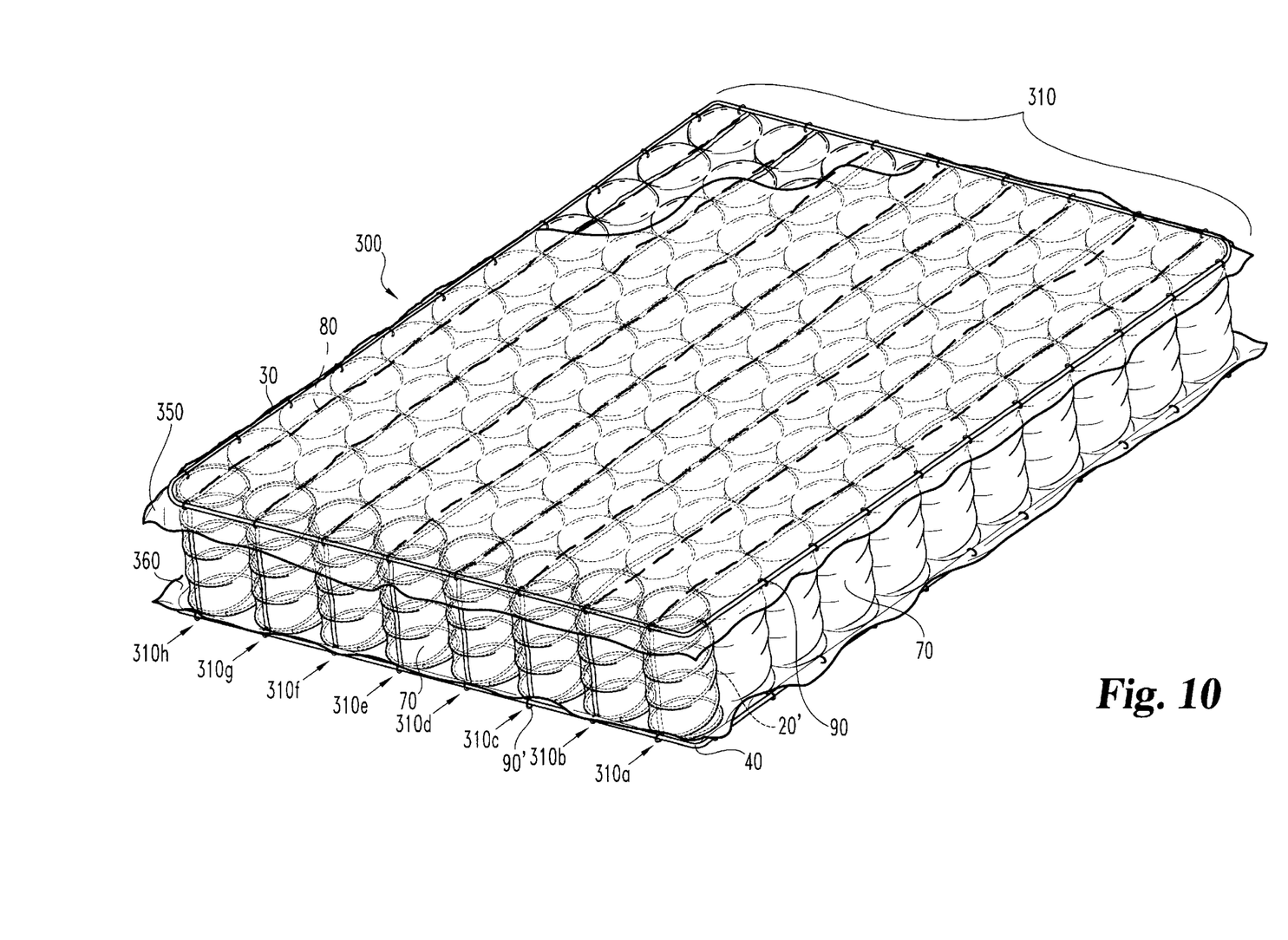
FIG. 10 depicts a perspective view of an alternative embodiment of a coil spring assembly having top and bottom securing members.
Figure 11:
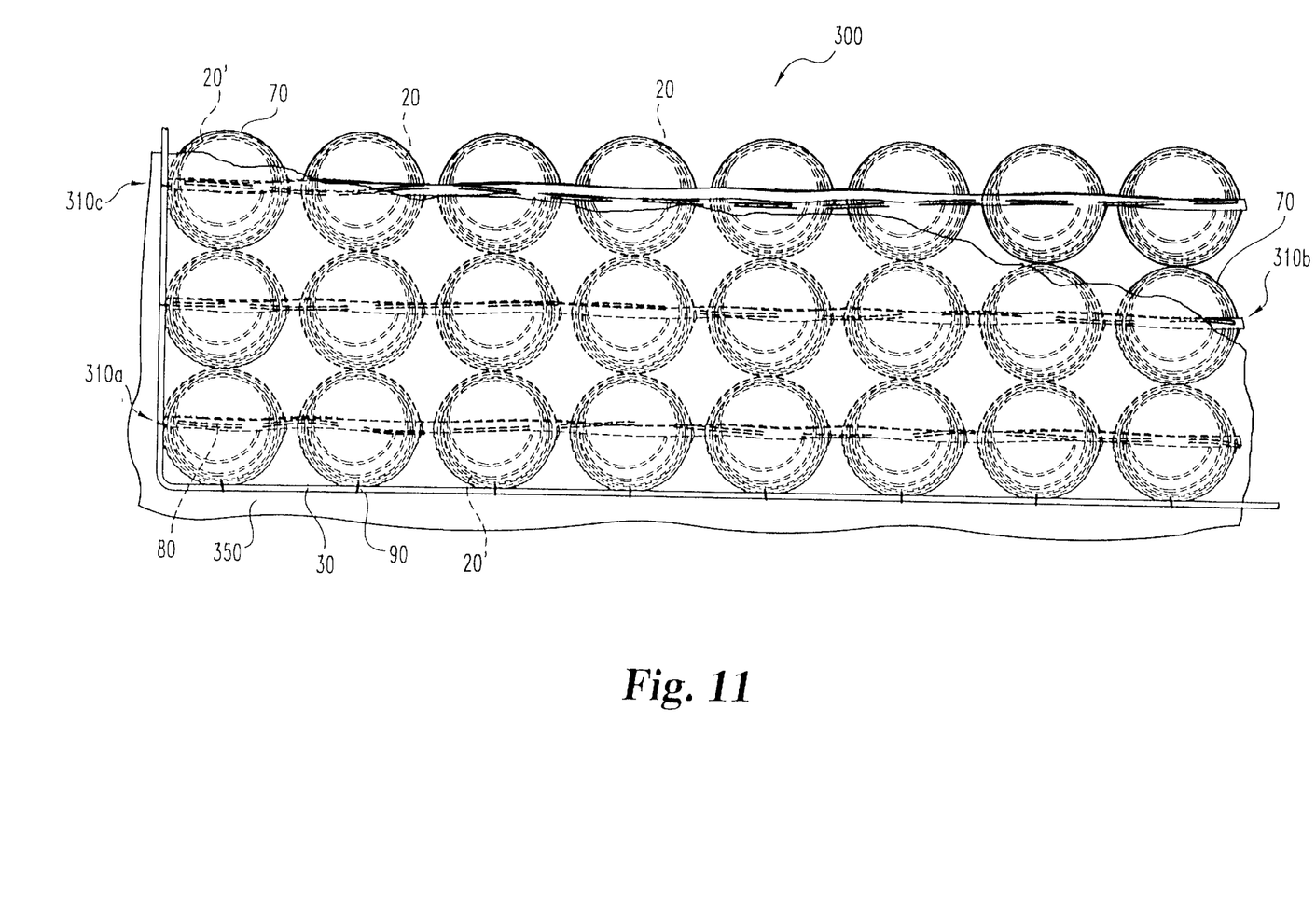
FIG. 11 depicts a top view of a portion of the coil spring assembly of FIG. 10.
Figure 12:
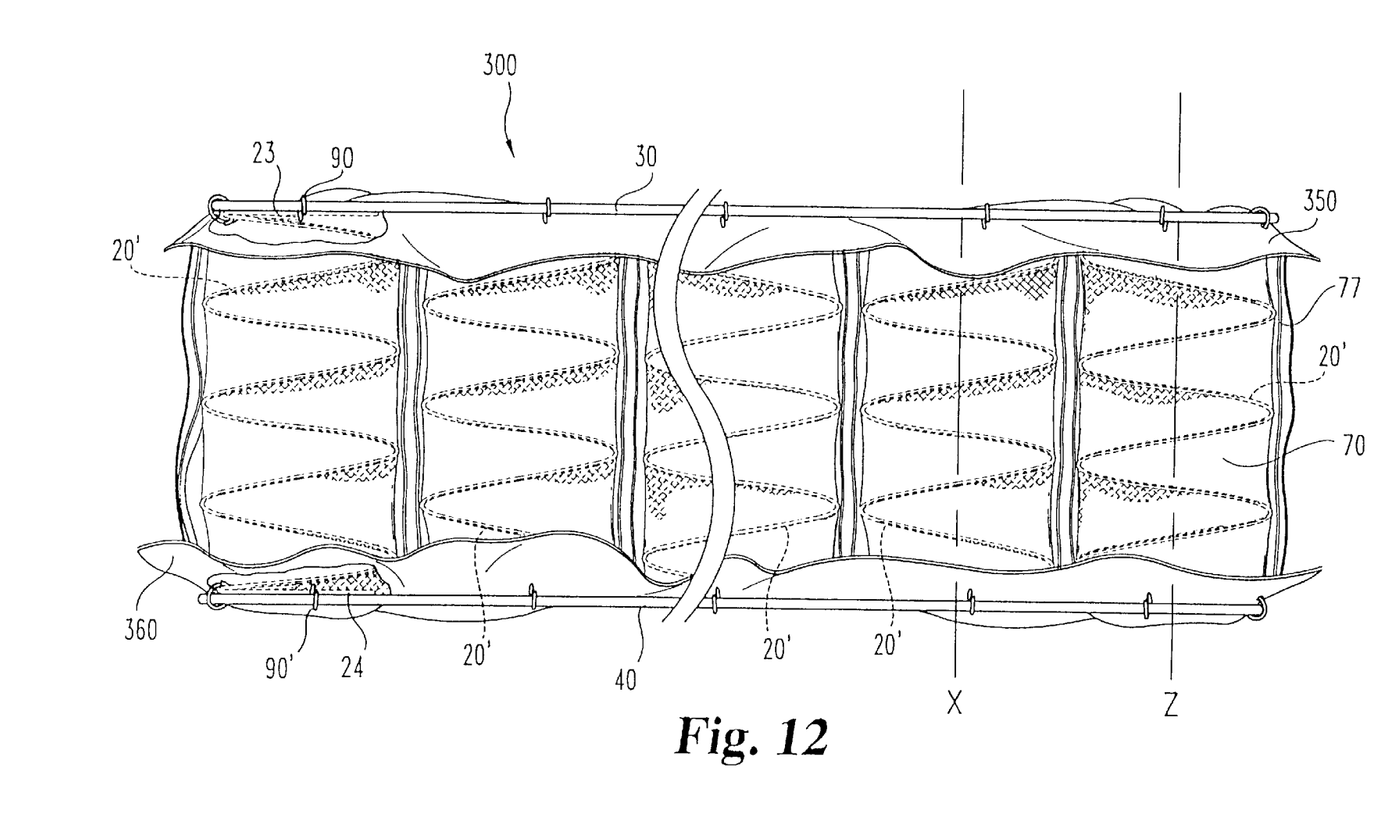
FIG. 12 depicts a side view of the coil spring assembly of FIG. 10.
Figure 13:
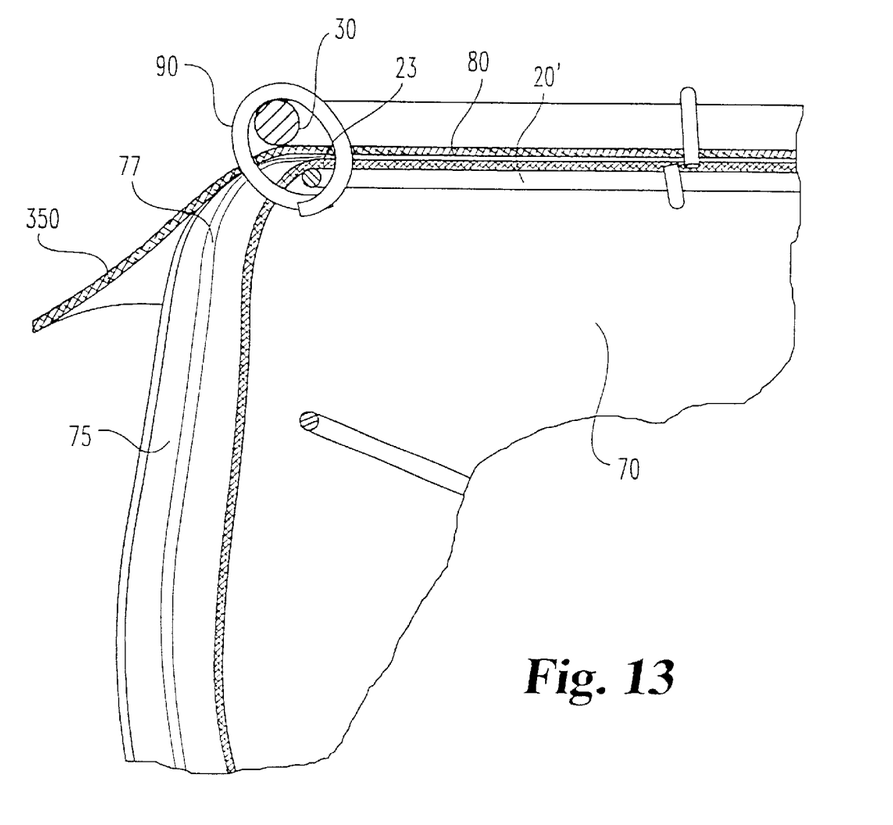
FIG. 13 depicts a magnified view of a cross-section of coil spring assembly 300 shown in FIG. 12, particularly showing how coil springs are secured with securing wire 90.

As best seen in FIG. 12, it is preferred that top coil 23 is secured to top border member 30 and bottom coil 24 is secured to bottom border member 40. The coils may be secured by any method known in the art, including metal clips and wire rings. However, the coils are preferably secured to the respective border members by securing wire 90, preferably a loop of wire. As seen in FIG. 13, one end of securing wire 90 wraps around top coil 23, passes through fabric 75 (that defines each pocket 70) and top securing sheet 350, wraps around top border member 30, passes through top securing sheet 350 and fabric 75 and then wraps around top coil 23. Similarly, one end of securing wire 90' wraps around bottom coil 24 (FIG. 12), passes through fabric 75 and bottom securing sheet 360, wraps around bottom border member 40, passes through bottom securing sheet 360 and fabric 75 and then wraps around bottom coil 24. Either one or several securing wires 90,90' may be used to secure perimetrical coil spring 20' at top coil 23 and bottom coil 24, respectively. It is preferred that four securing wires are used to secure the perimetrical coil springs 20' that are at each end of an outermost row, such as rows 310a and 310h (FIG. 10). For example, two securing wires 90 are preferably used to secure top coil 23 of a perimetrical coil spring 20' at the end of outermost row 310a and two securing wires 90' are used to secure bottom coil 24 of the perimetrical coil spring 20', as best seen in FIG. 12. In this embodiment, the two securing wires 90 are preferably positioned about 90° apart from each other, as are securing wires 90'.

As discussed above, coil spring assembly 300 is further stabilized by attaching perimetrical coil springs 20' to top border member 30 and bottom border member 40. Border members 30 and 40 are advantageously wires composed of a rigid material, such as automatic coiling and knotting wire, but preferably high carbon border and brace wire. The diameter of the wires may be chosen by one skilled in the art depending on the circumstances but is typically in the range of about 3 gauge to about 9 gauge, preferably about 6 gauge.

Figure 14:
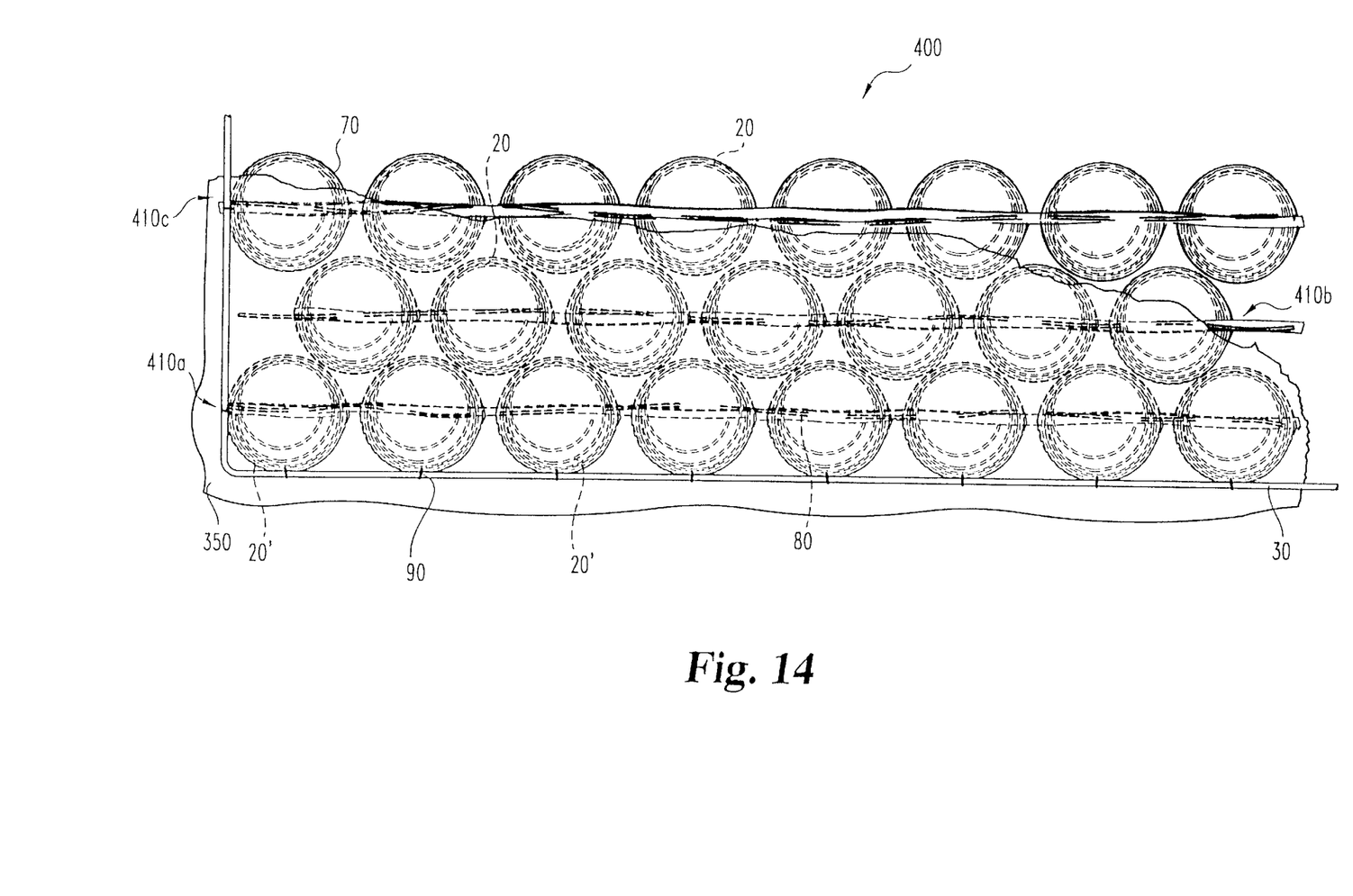
FIG. 14 is a fragmentary top view of an alternative embodiment of the coil spring assembly of FIG. 10, showing nesting of adjacent rows of pocketed coil springs.

Referring now to FIG. 14, alternative embodiment coil spring assembly 400 is shown including top securing member 30 wherein each row 410 is nested within an adjacent row 410 (e.g., row 410b is nested within row 410a, row 410c is nested within row 410b, etc.). Those coil springs that are not close enough to top border member 30 to be connected to the member are stabilized as they are connected to top securing sheet 350 and bottom securing sheet (not shown) in identical fashion to the embodiment of FIG. 1. Coil spring assembly 400 is thus identical to coil spring assembly 100, with the exception that coil spring assembly 400 further includes top border member 30, bottom border member 40 and securing wire 90,90'.

Figure 15:
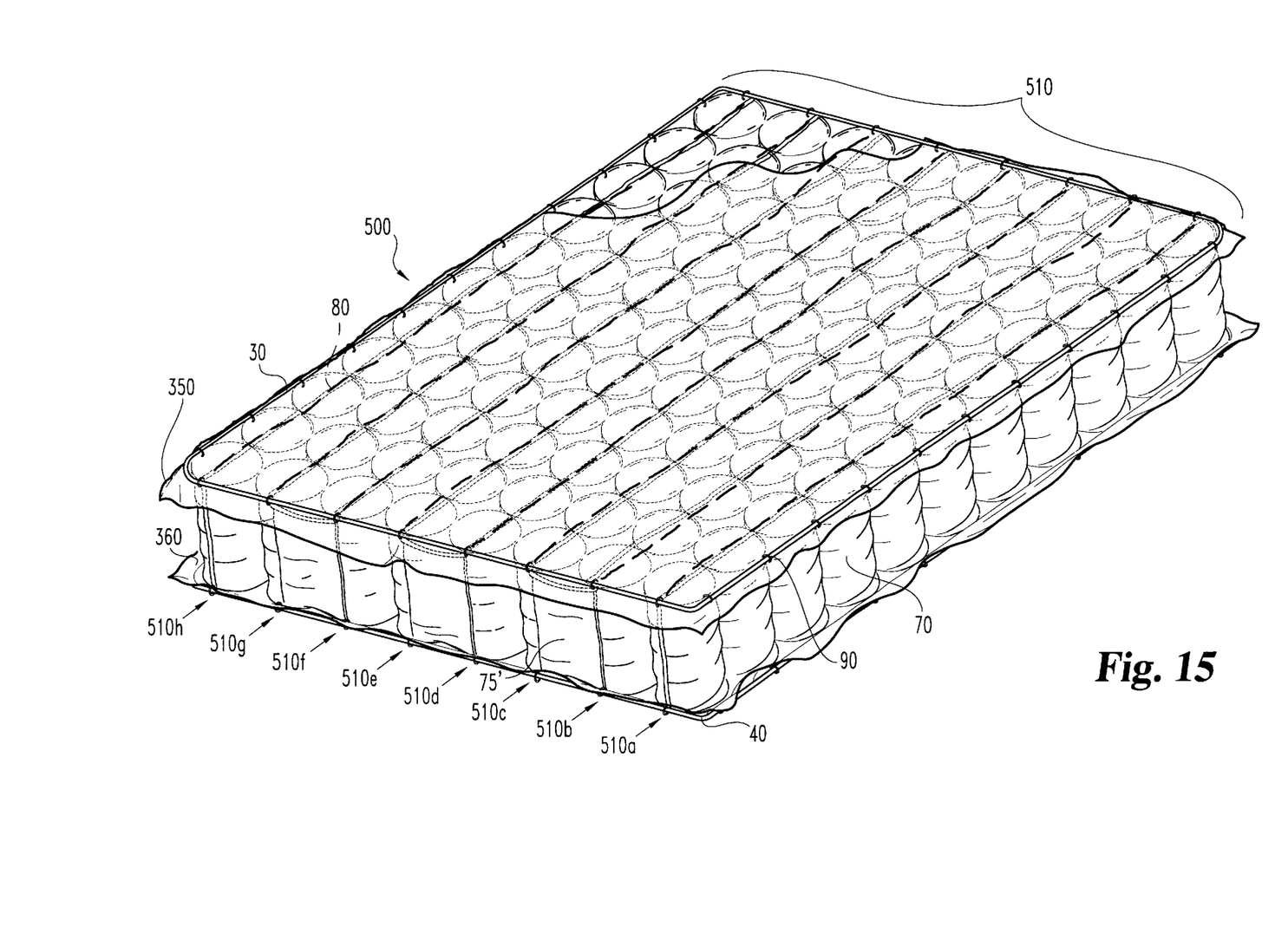
FIG. 15 depicts a perspective view of an alternative embodiment of a coil spring assembly of FIG. 10, wherein the pocketed coil springs are formed from a single long row, or string, which is placed in serpentine fashion in the assembly to form each row 510.

Referring now to FIG. 15, an alternative embodiment of the coil spring assembly shown in FIGS. 10–13 is shown wherein each row 510 (designated as 510a–510h) is formed from a single long row, or string, which is placed in serpentine fashion in the assembly to form coil spring assembly 500. Coil spring assembly 500 only differs from coil spring assembly 200 in that coil spring assembly 500 further includes top border member 30, bottom border member 40 and securing wires 90,90'.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

What is claimed is:

1. A coil spring assembly, comprising:
   rows of coil springs, each of said coil springs having a top surface, a bottom surface and a longitudinal axis, each of said coil springs having a uniform wire diameter and being heat-tempered prior to being individually encased in a pocket, said pocket including a top surface, a bottom surface and a side wall connecting said top surface and said bottom surface, a plurality of said coil springs being perimetrical coil springs, said pocketed coil springs forming a coil spring assembly partitioned into at least two sections, one of said sections being firmer than the other section, said firmer section formed from coil springs having a height in their relaxed state greater than the height of coil springs in said other section in their relaxed state;
   a top securing sheet, said top securing sheet having an inner face and an outer face; and
   a bottom securing sheet, said bottom securing sheet having an inner face and an outer face, said rows of coil springs being positioned between said top securing sheet and said bottom securing sheet.

2. The coil spring assembly of claim 1, said assembly further comprising a top border member, said top border member connected to said top surface of said perimetrical coil springs.

3. The coil spring assembly of claim 2, wherein said top border member is connected to said perimetrical coil springs by securing wire.

4. The coil spring assembly of claim 1, said assembly further comprising a bottom border member, said bottom border member connected to said bottom surface of said perimetrical coil springs.

5. The coil spring assembly of claim 4, wherein said bottom border member is connected to said perimetrical coil springs by securing wire.

6. The coil spring assembly of claim 1, wherein said inner face of said top securing sheet is connected to said top surface of a plurality of said pockets.

7. The coil spring assembly of claim 6, wherein said inner face of said top securing sheet is connected to said top surface of said plurality of said pockets by an adhesive.

8. The coil spring assembly of claim 1, wherein said inner face of said bottom securing sheet is connected to said bottom surface of a plurality of said pockets.

9. The coil spring assembly of claim 8, wherein said inner face of said bottom securing sheet is connected to said bottom surface of a plurality of said pockets by an adhesive.

10. The coil spring assembly of claim 1, wherein each of said coil springs has a uniform coil diameter.

* * * * *